(12) United States Patent
Safian

(10) Patent No.: US 7,055,691 B2
(45) Date of Patent: Jun. 6, 2006

(54) PLASTIC PACKAGING HAVING EMBEDDED MICRO-PARTICLE TAGGANTS

(75) Inventor: John W. Safian, Maumee, OH (US)

(73) Assignee: Owens-Illinois HealthCare Packaging Inc., Toledo, OH (US)

( * ) Notice: Subject to any disclaimer, the term of this patent is extended or adjusted under 35 U.S.C. 154(b) by 60 days.

(21) Appl. No.: 10/789,877

(22) Filed: Feb. 27, 2004

(65) Prior Publication Data
US 2005/0189255 A1   Sep. 1, 2005

(51) Int. Cl.
B65D 85/00   (2006.01)
B01J 13/02   (2006.01)

(52) U.S. Cl. .............. 206/459.5; 206/459.1; 264/4.1

(58) Field of Classification Search .......... 206/459.5, 206/807, 459.1; 283/82, 92–93; 264/4.1
See application file for complete search history.

(56) References Cited

U.S. PATENT DOCUMENTS

| | | | |
|---|---|---|---|
| 4,053,433 A | 10/1977 | Lee | |
| 4,390,452 A | 6/1983 | Stevens | |
| 4,606,927 A | 8/1986 | Jones | |
| 4,640,035 A | 2/1987 | Kind et al. | |
| 5,760,394 A | 6/1998 | Welle | |
| 6,165,609 A * | 12/2000 | Curatolo | 283/92 |
| 6,309,690 B1 | 10/2001 | Brogger | |
| 6,432,715 B1 | 8/2002 | Nelson et al. | |
| 6,455,157 B1 | 9/2002 | Simons | |
| 6,609,728 B1 | 8/2003 | Voerman et al. | |
| 6,620,360 B1 | 9/2003 | Simons | |
| 6,647,649 B1 | 11/2003 | Hunt et al. | |
| 2001/0041214 A1 | 11/2001 | Brogger et al. | |
| 2002/0122878 A1 | 9/2002 | Kerns et al. | |
| 2002/0129523 A1 | 9/2002 | Hunt | |
| 2003/0036201 A1 | 2/2003 | Nelson et al. | |
| 2003/0058990 A1 | 3/2003 | Kaiser et al. | |
| 2003/0211288 A1 | 11/2003 | Schotland | |
| 2004/0004829 A1 | 1/2004 | Policappelli | |
| 2004/0098891 A1* | 5/2004 | Hunt et al. | 283/93 |

FOREIGN PATENT DOCUMENTS

| | | | |
|---|---|---|---|
| GB | 2178481 | * | 2/1987 |
| WO | 9743751 | | 11/1997 |
| WO | 9945514 | | 9/1999 |
| WO | WO 03/095198 | | 11/2003 |
| WO | WO 2005/040001 | | 5/2005 |

* cited by examiner

Primary Examiner—Bryon P. Gehman

(57) ABSTRACT

An improvement to a package is provided that includes a container having a label secured thereto by an adhesive and a closure secured to the container. The improvement is for identifying the package and includes at least one of the container, the adhesive and the closure having a plurality of micro-particle taggants with multiple colored layers to provide a code for identifying the package.

12 Claims, 2 Drawing Sheets

PLASTIC PACKAGING HAVING EMBEDDED MICRO-PARTICLE TAGGANTS

The present invention is directed to plastic packages, and more particularly to a hollow plastic container and closure having an identifiable security measure to combat use of counterfeit plastic packages.

BACKGROUND AND SUMMARY OF THE INVENTION

In the production of plastic packages including closures and hollow plastic containers, it is common to injection mold or to extrude a preform, and then to blow mold the preform to achieve the final shape of a container. With some containers, at least a body portion of the container is of multilayer construction in which one or more intermediate layers form a barrier against gas transmission through the container. Whether of monolayer or multilayer construction, blow molded containers, and closures therefor, are often used for packaging personal care products and medical-type products, such as pharmaceuticals. Unfortunately, however, pharmaceuticals are sometimes counterfeited and packaged in counterfeit packages that look identical to genuine packages used to market genuine pharmaceuticals. Accordingly, such counterfeit packages are used to deceive pharmacists and consumers into buying counterfeit pharmaceuticals.

In accordance with one aspect of the present invention, an improvement to a package is provided that includes a container having a label adhered thereto and a closure secured to the container. The improvement is for identifying the package, and includes at least one of the container and the closure having a plurality of micro-particle taggants with multiple colored layers to provide a code for identifying the package. In the preferred embodiments of the invention, intermediate layer(s) of the container are of barrier resin polymer to retard migration of gases, water vapor and/or flavorants through the container sidewall. However, as will be described, the intermediate layer resin can be of any suitable type, including post consumer resin or the same resin as the matrix resin layer(s). In accordance with this preferred first aspect of the invention, a taggant is placed in the intermediate resin layer(s) to identify the package. This preferably is accomplished by blending the taggant in the resin prior to or during injection molding or extruding the preform. In the preferred embodiments of the invention, the taggant is a plurality of micro-particle taggants with multiple layers and having one or both of a fluorescing agent and a magnetic charge for initial detection of the presence of the taggant.

In accordance with a second aspect of the invention, a packaging component (e.g., a closure or a container) is provided that includes at least one layer of material blended with micro-particle taggants so as to render the packaging component identifiable and traceable back to a source.

In accordance with a third aspect of the invention, a method of making a plastic packaging component includes providing the component with micro-particle taggants having multiple color layers. The method also includes at least one of blending the micro-particle taggants in at least one resin used to mold the plastic packaging component, and blending the micro-particle taggants in an adhesive used to attach a label to the plastic packaging component.

BRIEF DESCRIPTION OF THE DRAWINGS

The invention, together with additional objects, features, advantages and aspects thereof, will be best understood from the following description, the appended claims and the accompanying drawings, in which:

DETAILED DESCRIPTION OF PREFERRED EMBODIMENTS

Figure 1:
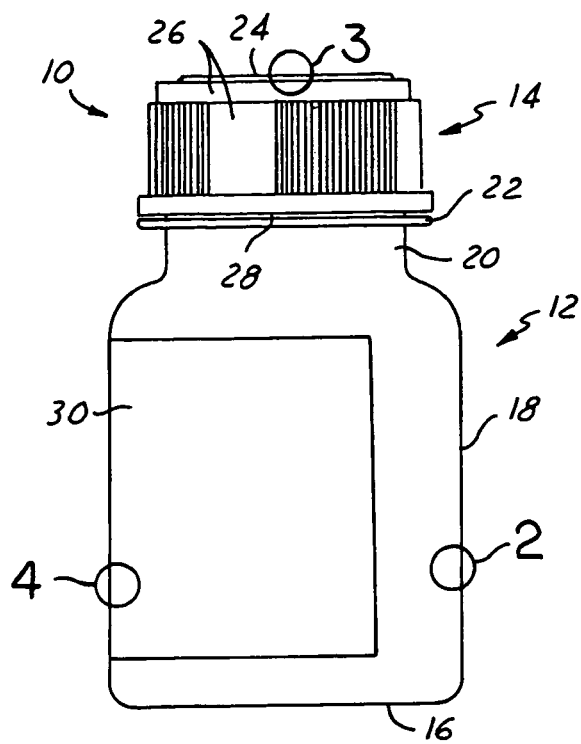
FIG. 1 illustrates a side elevational view of a plastic package including a labeled container and a closure according to one exemplary embodiment of the present invention.

In general reference to FIG. 1, there is illustrated a plastic package 10 in accordance with an exemplary embodiment of the present invention. The package 10 is assembled from individual plastic packaging components including a plastic container 12 for housing one or more products therein such as pharmaceutical pills or the like, and a closure 14 for sealingly retaining the products within the container 12.

In more specific reference to FIG. 1, the container 12 includes a closed bottom end 16, a sidewall 18 extending away from the closed bottom end 16, and a neck finish portion 20 terminating the sidewall 18, including a support flange 22, and ultimately terminating in an open end (not shown) substantially opposite of the closed bottom end 16. The container 12 may be produced by any known method of forming containers, but preferably is produced by blow forming a injection molded or extrusion formed preform (not shown). The closure 14 includes a base wall 24 from which depends an annular skirt wall 26 that terminates in an open end 28 that is substantially opposite of the base wall 24. The closure 14 preferably attaches to the container 12 via a threaded connection by external threads (not shown) on the neck finish 20 of the container 12 that interengage internal threads (not shown) projecting inwardly from the skirt wall 26 of the closure 14. Snap-bead attachment also may be employed. A label 30, such as a product label, prescription label, or the like, is adhesively attached to the sidewall 18 of the container 12.

Figure 2:
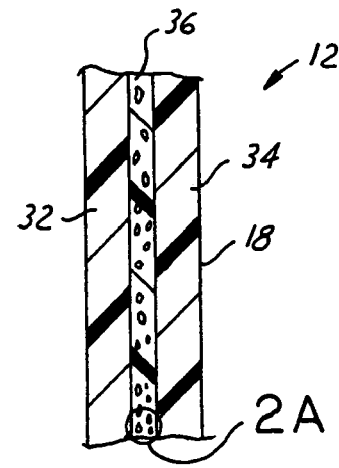
FIG. 2 illustrates an enlarged, fragmentary cross-sectional view of a sidewall of the container of FIG. 1, taken from circle 2 thereof.

FIG. 2 depicts an enlarged cross-sectional portion of the container of FIG. 1 taken from circle 2 thereof. Here, it can be seen that it is preferred that the sidewall 18 of the container 12 be multilayered, preferably from multiple molten resins, and includes inside and outside layers 32, 34 that are composed of a matrix resin, and an intermediate layer 36 that is composed of a barrier resin. The barrier resin polymer is provided to retard migration of gases, water vapor and/or flavorants through the container sidewall 18. It is contemplated that the multilayered sidewall 18 could be composed of more or fewer layers without departing from the scope of the invention. The multilayer container 12, and its preform, preferably have N matrix layers (e.g., two or three) and N-1 intermediate layers (e.g., one or two). In any case, the matrix resin layers 32, 34 are preferably composed of polyethylene terephthalate (PET) or polycarbonate (PC) polymer, but may be composed of any other desired container material. The intermediate layer 36 is preferably composed of a nylon or ethylene vinyl alcohol (EVOH) passive polymer, but may be composed of any other suitable passive or active barrier polymer used for containers. However, the intermediate layer 36 could also be of PET or polycarbonate composition, or of post consumer resin composition, in accordance with the broadest aspects of the invention inasmuch as it is the taggants in the intermediate layer(s) 36 that provides one of the distinguishing features of the invention.

Figure 2A:
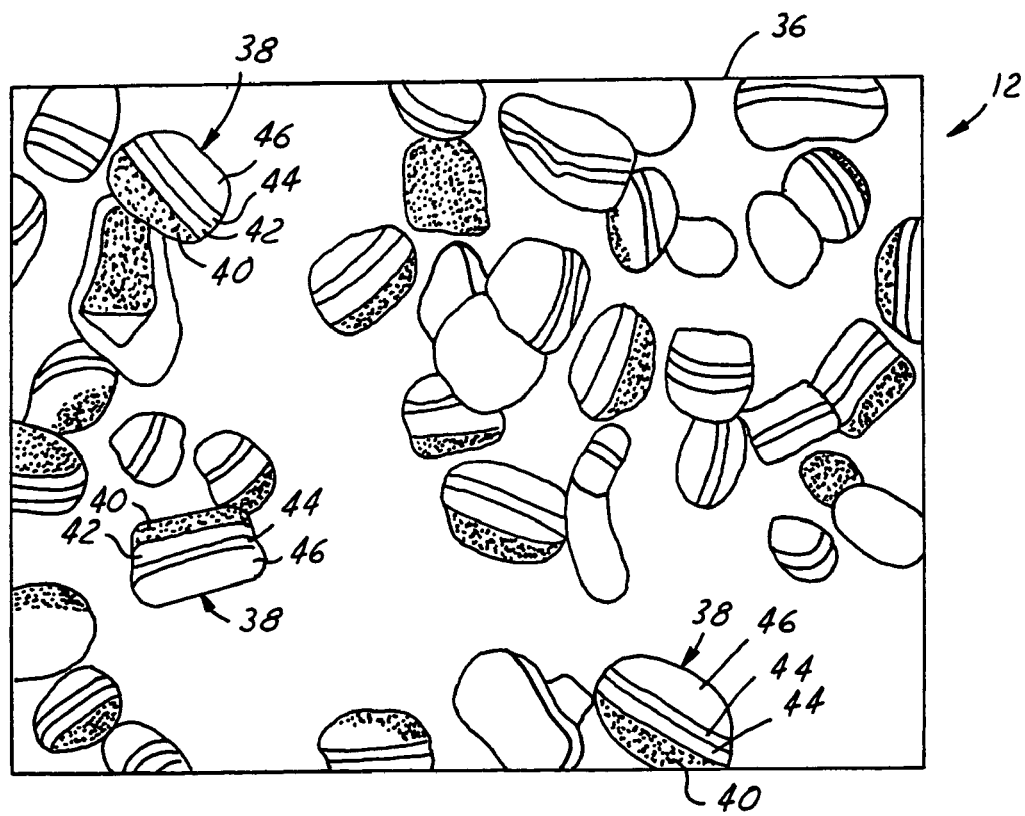
FIG. 2A illustrates an enlarged, fragmentary cross-sectional view, representative of a microscope view, of an intermediate layer of the container sidewall of FIG. 2, taken from circle 2A thereof.

Referring now to FIG. 2A, there is illustrated a microscopic view of the barrier layer 36 of FIG. 2, taken from circle 2A thereof. Here, one or more taggants are added to, or embedded within, the resin of the intermediate layer 36 before forming the container 12, for example prior to or during injection molding or extruding the preform that is used to blow form the container 12. The taggants are used as a unique identifier to make counterfeiting of the container 12 more difficult. Preferably, the taggants are a plurality of micro-particles 38 that share a common identifying feature, such as colored layers. The preferred size range of the micro-particles 38 is from 44 to 75 microns, but the micro-particles 38 may range in size from 20 to 600 microns and may range in concentration from 5 to 300 particles per square inch. A unique signature, code or colored layer scheme is provided on, or entirely throughout, each microparticle 38. The colored layer scheme may be similar to that used to identify various electrical components, such as the National Electrical Code for identifying wires, or the Electronics Industry Association color code for identifying resistors and the like. For example, each micro-particle 38 shown here includes a black layer 40, a first white layer 42, a red layer 44, and a second white layer 46. This is just one of thousands, and perhaps millions depending on the numbers of layers and colors used, of different color combinations that can be used to uniquely identify a particular product or lot of packages.

In addition to the unique color code scheme, the micro-particle taggants 38 may also be provided with other identifiable features. For example, the taggants 38 may be provided with a fluorescing agent. The fluorescing agent is any particularly discernable material under ultraviolet light, and is preferably provided on the taggants such as on one or more faces, or as one of the layers. Accordingly, the package 10 can be initially inspected for the presence of the micro-particle taggants 38 and, if the presence thereof is verified, the package 10 can thereafter be further inspected under a microscope to identify the color code of the taggants 38. In another example, the taggants 38 may be magnetized to a particular attractive strength so as to provide a unique magnetic signature for further identifying and tracing the packaging and products. Micro-particle taggants are commercially available, such as from Microtrace, LLC of Minneapolis, Minn.

Figure 2B:
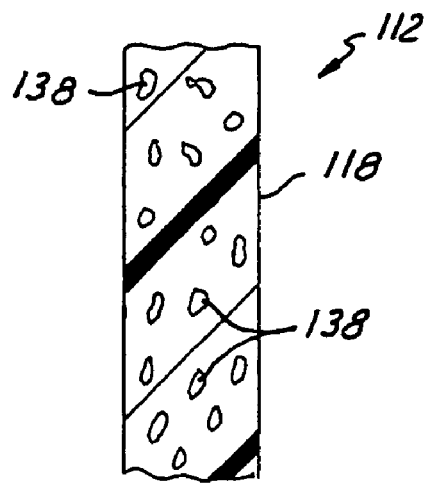
FIG. 2B illustrates an enlarged, fragmentary cross-sectional view of a sidewall alternative to that depicted in FIG. 2, according to another exemplary embodiment of the present invention.

FIG. 2B illustrates an alternative exemplary embodiment of the present invention. FIG. 2B illustrates a monolayer sidewall 118 of a container 112 that is alternative to the multilayer sidewall 18 depicted in FIG. 2. Here, micro-particle taggants 138 are added to, or embedded within, the resin of the monolayer sidewall 118 before forming the container 112, for example prior to or during injection molding or extruding the preform that is used to blow form the container 112.

Figure 3:
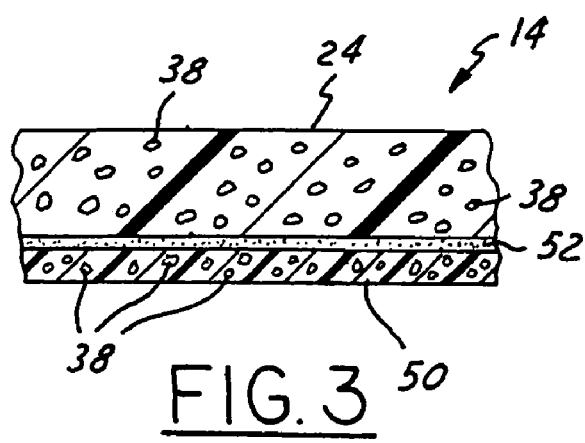
FIG. 3 illustrates an enlarged, fragmentary cross-sectional view of a closure of FIG. 1, taken from circle 3 thereof.

FIG. 3 illustrates an enlarged, fragmentary cross-sectional view of the closure 14 of FIG. 1. The micro-particle taggants 38 may be added to, or embedded within, the resin of closure 14 before forming the closure 14, for example prior to or during injection or compression molding of the closure 14. The closure base wall 24 may be a multilayer base wall, with the taggants disposed in an intermediate barrier layer. FIG. 3 also shows a modification in which a liner 50 is disposed on the inside surface of base wall 24, either by being molded in situ on the base wall or adhered to the base wall by a layer of adhesive 52. Micro-particle taggants 38 may included in liner 50 and/or adhesive 52, in addition to or instead of including the taggants in the closure shell.

Figure 4:
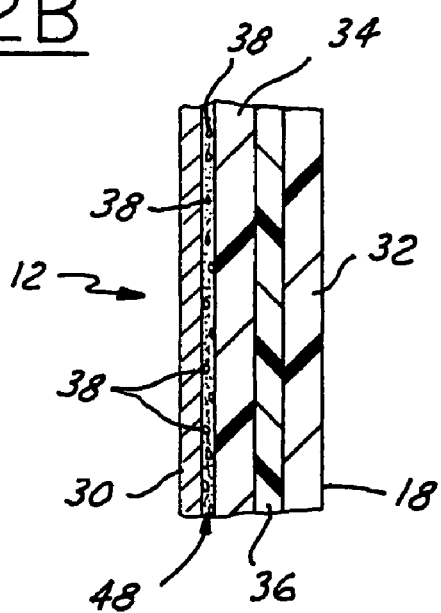
FIG. 4 illustrates an enlarged, fragmentary cross-sectional view of the sidewall, adhesive, and label of the container of FIG. 1, taken from circle 4 thereof.

FIG. 4 illustrates an enlarged, fragmentary cross-sectional view of another exemplary embodiment of the present invention. The label 30 is attached to the multilayer sidewall 18 of the container 12 by an adhesive layer 48. The adhesive layer 48 includes the micro-particle taggants 38 embedded therein, such as by blending the micro-particle taggants 38 in liquid adhesive that may be applied to the back of the label 30 or to the sidewall 18 of the container 12.

With one or more of the exemplary embodiments discussed above, a "genuine" package, container and/or closure of the present invention including embedded taggants can be more readily distinguished from a non-genuine container not bearing such taggants. A particular color scheme can be associated with a particular legitimate origin or source such as a container manufacturer, a particular product or pharmaceutical, a manufacturer, a factory or production facility, a marketer, a distributor, a retailer, a pharmacist, or the like. By inspecting a portion of the packaging, such as under a microscope at 50–100× power, the taggant may be identified, and a product and/or its packaging can thereby be verified as authentic in the field or marketplace, wherein the packaging can be reliably traced back to a particular desired origin or source. In other words, if there is any question about the legitimacy of the packaging or product therein, the taggants provide traceable proof of origin of the packaging. In essence, the present invention provides a code for identifying the authenticity of packaging or products that is a reliable packaging security feature against counterfeiting of the packaging or products contained therein and, therefore, the tagged package is difficult for counterfeiters to reproduce. Thus, by using the present invention, pharmacists and consumers are relatively more protected against the intrusion of counterfeit pharmaceuticals into the marketplace.

In accordance with another aspect of the invention, different taggants could be used in different packaging components. For example, the taggants in the closure shell, the closure liner or the liner adhesive could indicate the manufacturer, while the taggants in the container or label adhesive could indicate the product or lot number. It must also be understood that, although fluorescent material preferably is used to indicate presence of taggants, such use of fluorescent or magnetic material is strictly optional.

There have thus been described a package, container, closure, and method of manufacture that fully satisfy all of the objects and aims previously set forth. The present invention has been disclosed in conjunction with presently preferred embodiments thereof, and a number of modifications and variations have been discussed. Other modifications and variations will readily suggest themselves to persons of ordinary skill in the art in view of the foregoing description. Finally, directional words such as top, bottom, upper, lower, radial, circumferential, and the like are employed by way of description and not limitation. Indeed, the invention is intended to embrace all modifications and variations as fall within the spirit and broad scope of the appended claims.

The invention claimed is:

1. A package that includes a container and a closure for securement to said container,
    at least one of said closure and said container being of molded plastic construction and having a plurality of microparticle taggants embedded therein as molded,
    said microparticle taggants having multiple colored layers to provide a code for identifying said package.

2. The package set forth in claim 1 wherein said at least one of said closure and said container has a wall of multilayer construction as molded, and wherein said microparticle taggants are embedded in at least one layer of said wall.

3. The package set forth in claim 2 wherein said wall has surface layers and at least one intermediate layer, and wherein said microparticle taggants are embedded in said at least one intermediate layer.

4. The package set forth in claim 3 wherein said wall has multiple intermediate layers and said microparticle taggants are embedded in one of said intermediate layers.

5. The package set forth in claim 3 wherein said at least one intermediate layer is of barrier resin construction.

6. The package set forth in claim 1 wherein said taggants include at least one of a fluorescing agent and a magnetic charge to enable initial detection of presence of said taggants.

7. A method of making a packaging component that is a closure or a container, which includes the steps of:
    (a) blending with a plastic resin a plurality of microparticle taggants having multiple colored layers, and
    (b) molding said packaging component from said resin such that said microparticle taggants are embedded in said packaging component as molded.

8. A molded plastic container that includes at least one layer of plastic material and a plurality of microparticle taggants embedded in said at least one layer as molded, said taggants having colored layers to provide a code for identifying the container.

9. The container set forth in claim 8 wherein said container has a body with multiple plastic layers, and wherein said microparticle taggants are disposed in at least one of said layers.

10. The container set forth in claim 9 wherein said layers include two outer layers and at least one intermediate layer, with said taggants being disposed in said at least one intermediate layer.

11. A closure that includes a shell of molded plastic construction and having a plurality of microparticle taggants embedded in said shell as molded, said microparticle taggants including multiple color layers.

12. A closure that includes a shell of molded plastic construction, a liner disposed within said shell, and a plurality of microparticle taggants having multiple color layers embedded within said shell, or within both said shell and said liner.

* * * * *